US007804662B2

(12) United States Patent  
Chen et al.

(10) Patent No.: US 7,804,662 B2
(45) Date of Patent: Sep. 28, 2010

(54) PERPENDICULAR MAGNETIC RECORDING HEAD INCLUDING WRAP AROUND SHIELD WITH NOTCHED TOP WRITE GAP AND METHOD OF FABRICATING THE SAME

(75) Inventors: Tsung Yuan Chen, San Jose, CA (US); Hung-Chin Guthrie, Saratoga, CA (US); Yimin Hsu, Sunnyvale, CA (US); Ming Jiang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 519 days.

(21) Appl. No.: 11/645,390

(22) Filed: Dec. 26, 2006

(65) Prior Publication Data

US 2008/0151437 A1    Jun. 26, 2008

(51) Int. Cl.
*G11B 5/127* (2006.01)
(52) U.S. Cl. .................................. 360/125.12
(58) Field of Classification Search ............ 360/125.12, 360/125.47, 125.08, 319, 313; 29/603.13, 29/603.14
See application file for complete search history.

(56) References Cited

U.S. PATENT DOCUMENTS

| 6,804,879 | B2 | 10/2004 | Hsiao et al. | |
|---|---|---|---|---|
| 6,870,712 | B2 | 3/2005 | Chen et al. | |
| 7,054,105 | B2 | 5/2006 | Mochizuki | |
| 7,293,345 | B2 * | 11/2007 | Matono et al. | 29/603.13 |
| 2003/0112555 | A1 * | 6/2003 | Sato et al. | 360/126 |
| 2004/0177493 | A1 | 9/2004 | Hsiao et al. | |
| 2004/0218312 | A1 | 11/2004 | Matono | |
| 2005/0024764 | A1 | 2/2005 | Hsiao et al. | |
| 2005/0047013 | A1 | 3/2005 | Le et al. | |
| 2005/0117251 | A1 * | 6/2005 | Matono et al. | 360/126 |

\* cited by examiner

*Primary Examiner*—Allen T Cao
(74) *Attorney, Agent, or Firm*—Silicon Valley Patent Group LLP; Omkar Suryadevara (57) ABSTRACT

In a perpendicular recording head, a notch is formed in the top write gap at a location on top of the main pole. A perpendicular head with this notched top write gap structure has less transition curvature and better writability while reducing the adjacent track interference (ATI). Also, the process used to fabricate the head ensures that the trailing edge (writing edge) of the main pole is extremely flat with no corner rounding.

17 Claims, 7 Drawing Sheets

PERPENDICULAR MAGNETIC RECORDING HEAD INCLUDING WRAP AROUND SHIELD WITH NOTCHED TOP WRITE GAP AND METHOD OF FABRICATING THE SAME

FIELD OF THE INVENTION

This invention relates to perpendicular recording on a magnetic recording disk and in particular to a perpendicular recording head having a notched wrap around shield.

BACKGROUND OF THE INVENTION

In perpendicular recording, data are recorded on a magnetic recording disk by magnetizing the recording medium in a direction perpendicular to the surface of the disk. In this type of recording the magnetic easy axes of the magnetic grains which store the recorded data are arranged perpendicular to the disk surface, instead of parallel to the disk surface as is the case in longitudinal recording. Perpendicularly recorded data are more stable than longitudinal data, and the data can be recorded at a higher density than longitudinal data. The coercivity of the medium is higher, since the magnetic recording layer is in effect "inside the gap" between the head and a soft underlayer (SUL) that is located under the magnetic layer.

In addition, for the same read head design, perpendicular data provide a greater read back amplitude. The disk has a higher magnetic moment-thickness product (MrT). For the same physical width of the read head, the magnetic read width is narrower.

High track density heads require narrow pole widths. A sufficiently short flare length is necessary to maintain the write field strength of a narrow track PMR write head. As a result, the widened portion behind the flare point of the pole piece is close to the medium and can produce undesired fields to the extent that the data in adjacent tracks are erased. A high track density write head inevitably needs to balance writability and adjacent track interference (ATI).

Figure 1:
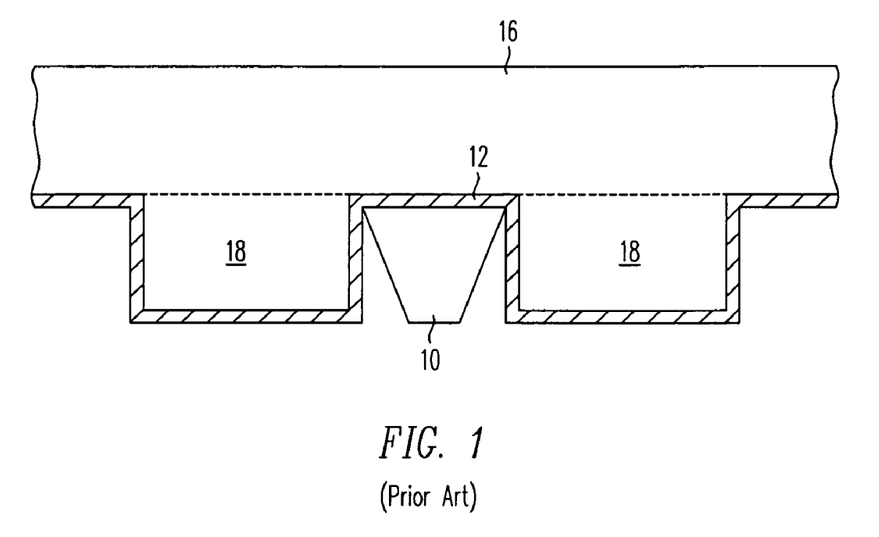
FIG. 1 illustrates an prior art magnetic recording head with a wrap around shield, viewed from the air-bearing surface (ABS).

The wrap around shield (WAS) design is a very promising approach for high track density application. As shown in FIG. 1, the WAS design has a trailing shield 16 placed in the proximity of the trailing side of the pole 10, separated from pole 10 by a small gap 12, and side shields 18 which drape down along the sides of the pole 10. In the WAS design, the fringe fields are mostly confined between the pole and side shields and therefore the fringe fields create much less interference with adjacent tracks.

Nonetheless, there is a need for further improvements and fabrication method for achieving less transition curvature and less flux shunting and therefore better writability while reducing ATI.

SUMMARY OF THE INVENTION

In accordance with this invention, the effects of adjacent track interference (ATI) are reduced by the use of a perpendicular magnetic head including a wrap around shield in which a notch is formed in the top write gap on top of the main pole. In addition, a perpendicular head by the use of this notched wrap around shield structure of this invention has less transition curvature and better writability. The reduced transition curvature is due to the modification of the main pole field contour by the notched top write gap. And the better writability is due to less flux shunting to the shield. Also, the process used to fabricate the head ensures that the trailing edge of the main pole is extremely flat with no corner rounding.

BRIEF DESCRIPTION OF THE DRAWINGS

The invention will be better understood by reference to the following drawings, which are not necessarily drawn to scale.

DESCRIPTION OF THE INVENTION

Figure 2:
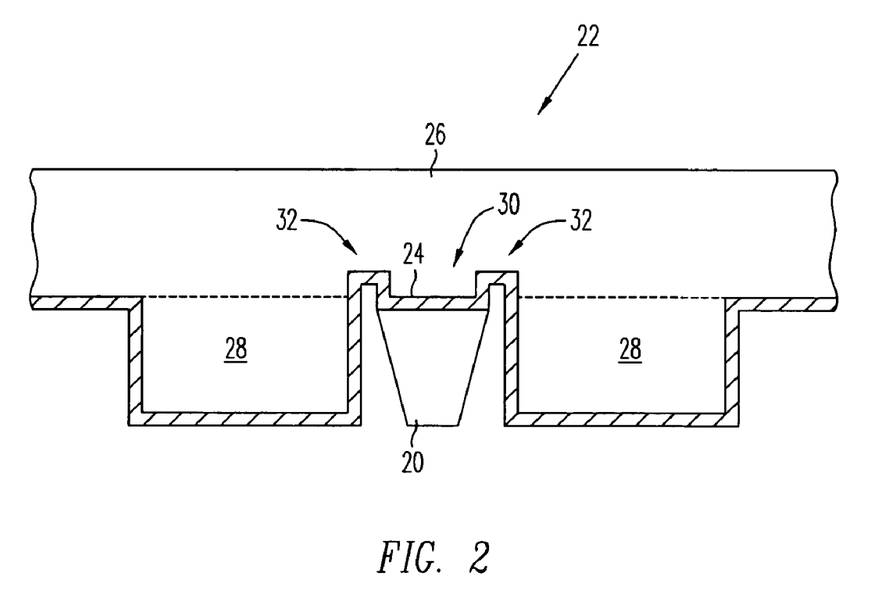
FIG. 2 illustrates an ABS view of a magnetic recording head with a wrap around shield and a notched top write gap over the main pole in accordance with the invention.

FIG. 2 illustrates a main pole with a notched top write gap above the main pole according to the invention, viewed from the air-bearing surface (ABS). Shown are a main pole 20, a wrap around shield 22 and a top write gap 24 between main pole 20 and wrap around shield 22. Wrap around shield 22 includes a trailing shield 26 and side shields 28. In accordance with this invention, a notch 30 is formed in the top write gap 24 at a location on the top of main pole 20. As is apparent from FIG. 2, side shields 28 extend in a direction perpendicular to trailing shield 26. The formation of the notch 30 in the top write gap 24 creates recesses 32 in trailing shield 26 on either side of notch 30.

Figure 3A:
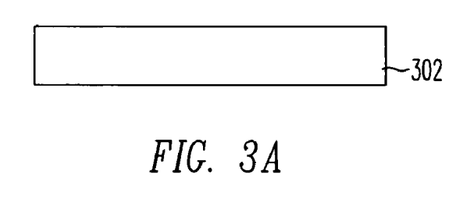
FIGS. 3A-3K illustrate a process of fabricating a magnetic recording head with a notched top write gap.
Figure 3B:
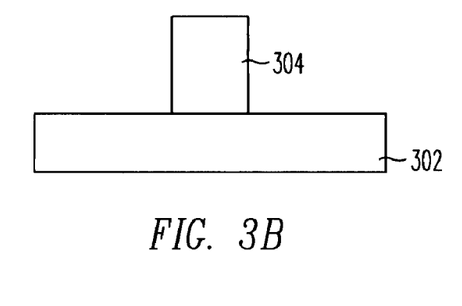

FIGS. 3A-3K illustrate a process for fabricating the structure shown in FIG. 2. The illustrated process begins after a layer 302 of a magnetic material such as CoFe, CoNiFe, NiFe, or laminated magnetic materials such as CoFe/Cr/CoFe/NiCr, which will form the main pole, has been deposited, as shown in FIG. 3A. The process sequence up to this point is well known to persons of skill in the art and therefore will not be described here. A photoresist mask layer 304 is then deposited on layer 302 and patterned, as shown in FIG. 3B, to a dimension which will determine the width of the main pole, often referred to as the critical dimension (CD). Mask layer 304 may deposited as a series of sublayers. In one embodiment mask layer 304 consists of 193 TIS 250 nm, Durimide 60 nm, SiO2 100 nm, and Durimide 1000 nm. The total thickness of mask layer 304 may be ~1.5 μm, for example.

Figure 3C:
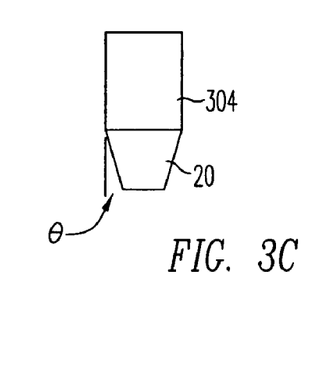
Figure 3D:
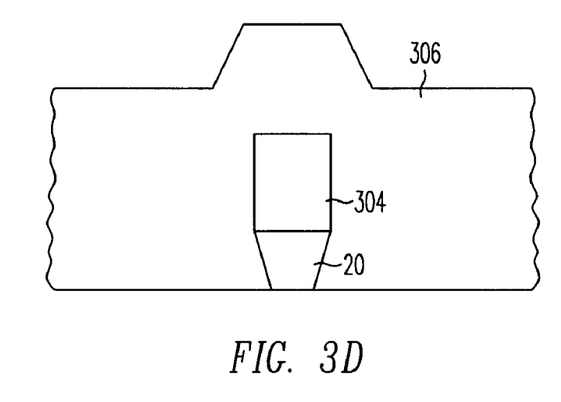
Figure 3E:
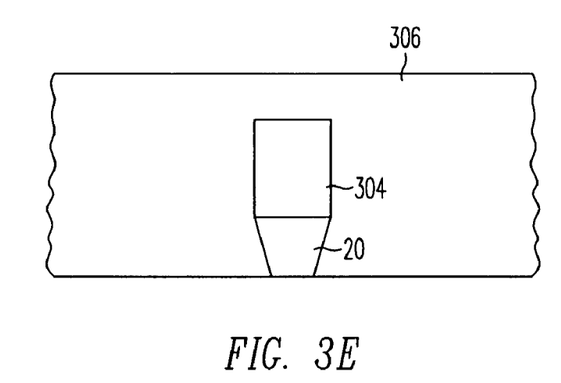

Using layer 304 as a mask, magnetic layer 302 is etched, preferably using a ion milling process, to form main pole 20, as shown in FIG. 3C. The ion milling undercuts the mask layer 302 to give main pole 20 a trapezoidal shape, with its sides slanted at an angle Θ. An alumina layer 306 is then deposited. As shown in FIG. 3D, alumina layer 306 is subjected to a chemical mechanical planarization (CMP) to provide a flat surface 308. A process using an $Al_2O_3$ abrasive, APS oxidizer, BTA corrosion inhibitor, and a chemical at a pH of 10 may be employed. The resulting structure is shown in FIG. 3E, which shows that the main pole 20 remains covered by alumina layer 306. It should be noted in the prior art, the CMP process exposes the main pole 20 and as a result the upper corners of main pole 20 become rounded. This detracts from the performance of the finished head.

Figure 3F:
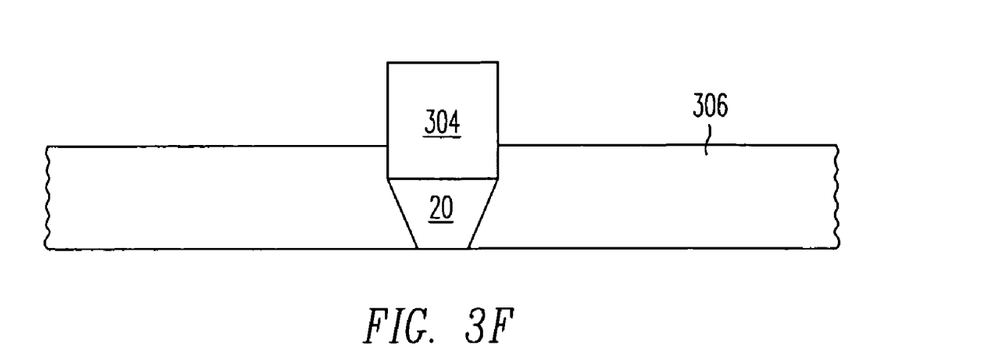
Figure 3G:
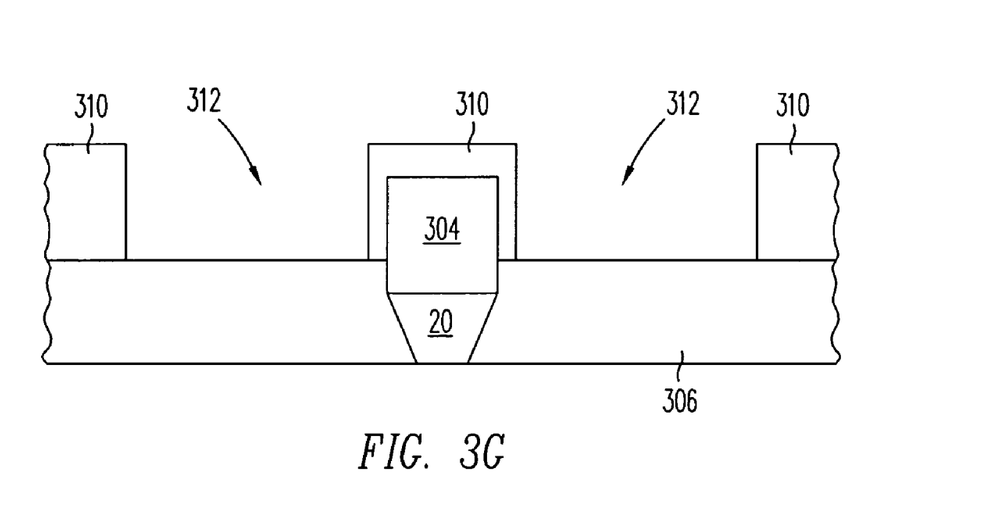
Figure 3H:
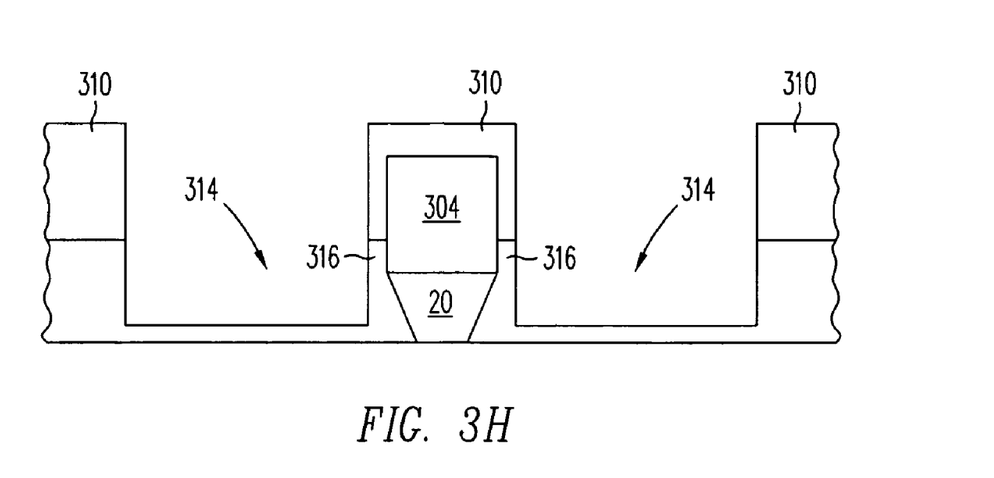

A reactive ion milling process is applied to reduce the surface of alumina layer 306 and expose the top of mask layer 304, as shown in FIG. 3F. Following the ion milling, the surface 309 of alumina layer 306 may be 50 nm above the top surface of main pole 20. Another photoresist mask layer 310 is deposited and patterned as shown in FIG. 3G, with openings 312 on each side of photoresist layer 304. Using layer 310 as a mask, another reactive ion milling process is performed, side openings 312 creating cavities 314 in alumina layer 306 on each side of main pole 20. The resulting structure is shown in FIG. 3H. Because the portion of photoresist layer 310 between the openings 312 is wider than main pole 20, the ion milling process produces upward projecting ridges 316 on each side of main pole 20. The vertical dimension of ridges 316 could be 50 nm.

Figure 3I:
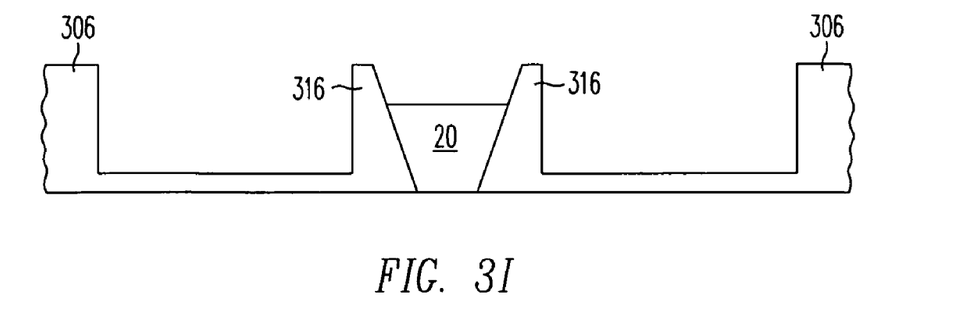

Mask layers 304 and 310 are then removed. A reactive ion etch (RIE) and ion milling may be applied, which causes the inner sides of ridges 316 to become slightly angled for better gap and shield deposition, as shown in FIG. 3I.

Figure 3J:
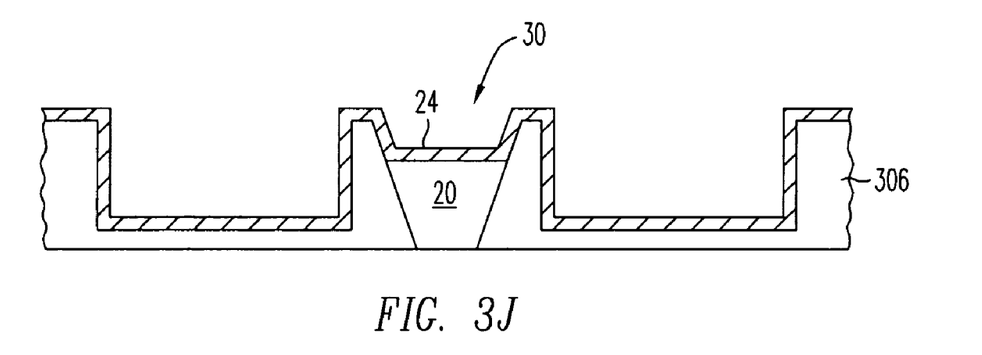

Next, as shown in FIG. 3J, top write gap 24 is deposited on the exposed surfaces of main pole 20 and alumina layer 306. Top write gap 24 is preferably deposited by sputtering and may have a thickness of 30 nm, for example. The top write gap material could be Rh or Ru. As is shown in FIG. 3K, the deposition of top write gap 24 over ridges 316 forms notch 30 in top write gap 24.

Figure 3K:
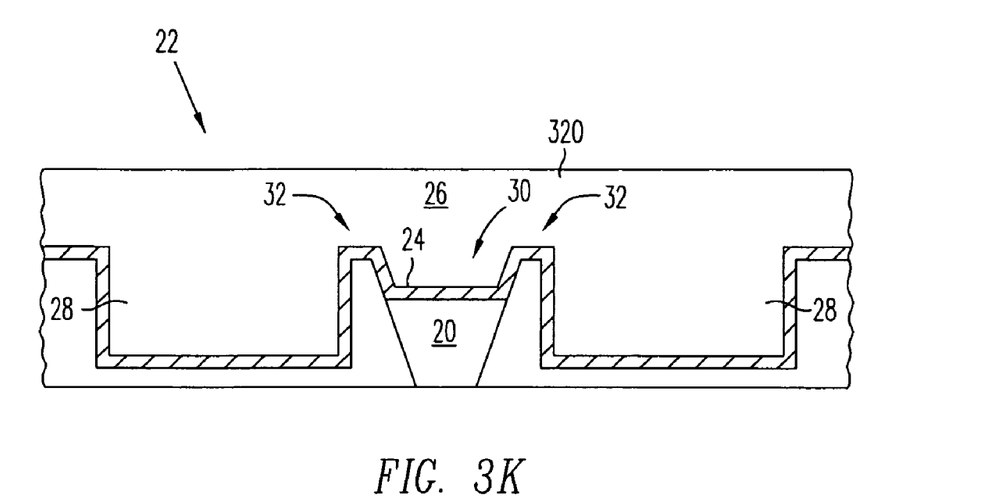

Following the deposition of a seed layer (not shown), a NiFe layer 320 is deposited by plating as shown in FIG. 3K. NiFe layer 320 fills cavities 314 and notch 30, thereby forming side shields 28 and trailing shield 26. Because the same photoresist layer 304 that was used to form main pole 20 is also used to define the location of ridges 316, the resulting notch 30 is self-aligned to main pole 30. Ridges 316 and the overlying top write gap 24 also form recesses 32 in trailing shield 26.

A CMP process may be performed on the top surface of NiFe layer 320 to form wrap around shield 22, similar in structure to the wrap around shield shown in FIG. 2. An alumina overcoat (not shown) is normally deposited on the top surface of the finished trailing shield 26.

Figure 4A:
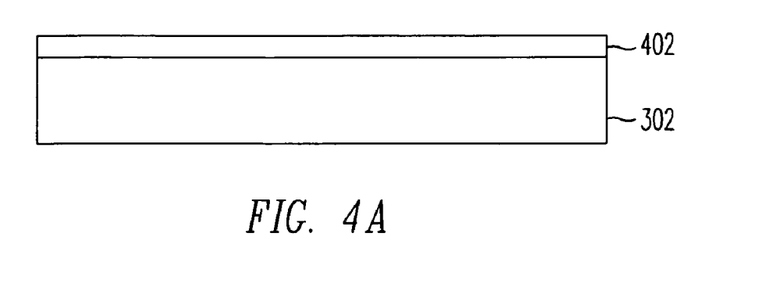
FIGS. 4A-4K illustrate an alternative process of fabricating a magnetic recording head with a notched top write gap.
Figure 4B:
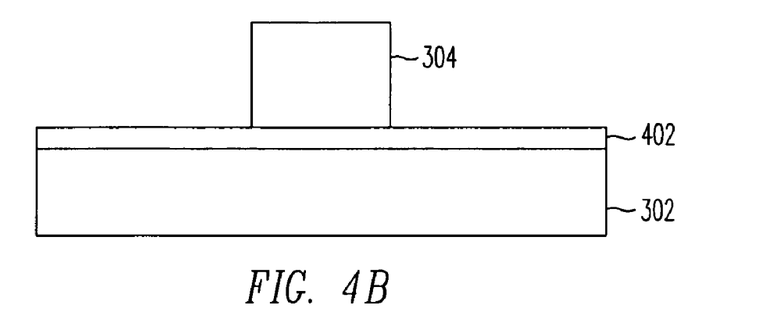
Figure 4C:
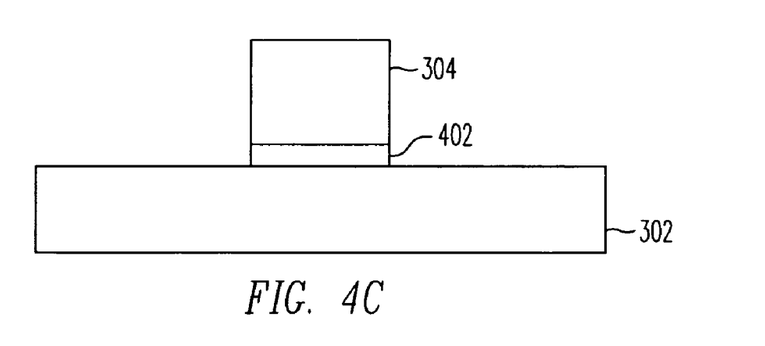
Figure 4D:
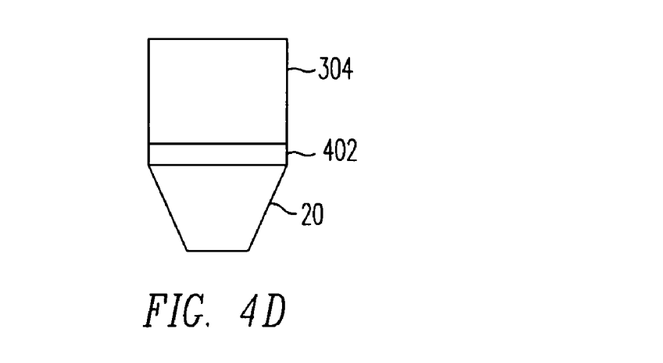

FIGS. 4A-4G illustrate an alternative process for fabricating a notched wrap around shield having a notched top write gap in accordance with this invention. In this process, as shown in FIGS. 4A and 4B, a hard mask layer 402, which in this embodiment is made of alumina, is deposited on magnetic layer 302 prior to the deposition of photoresist mask layer 304. Hard mask layer 402 may be 20 nm thick, for example. After photoresist mask layer 304 has been patterned, the exposed portions of hard mask layer 402 are etched, as shown in FIG. 4C. The presence of alumina layer 402 on top of magnetic layer 302 allows better pole width control in the ion milling process that is used to form main pole 20. This also permits the formation of a larger angle Θ than is possible with only a photoresist mask protecting magnetic layer 302. As noted above, the trapezoidal shape of main pole 20 is advantageous in preventing data erasure on the adjacent track. The finished shape of main pole 20 is shown in FIG. 4D.

Figure 4E:
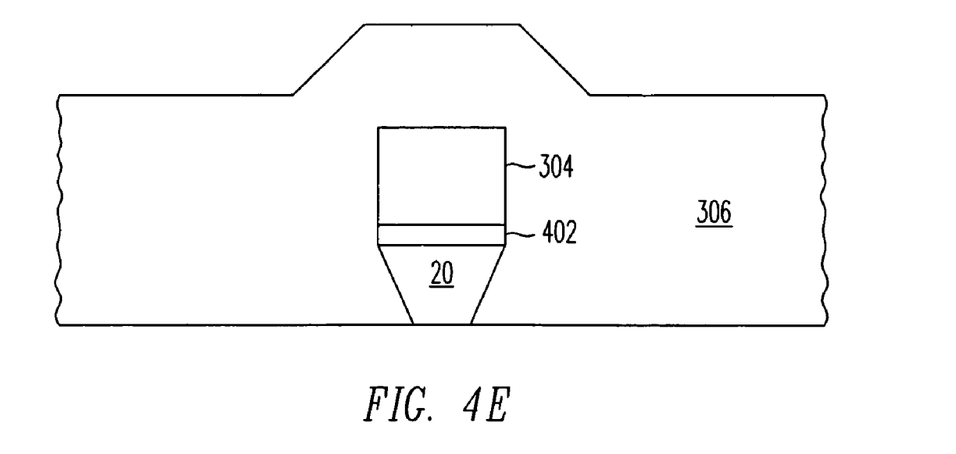
Figure 4F:
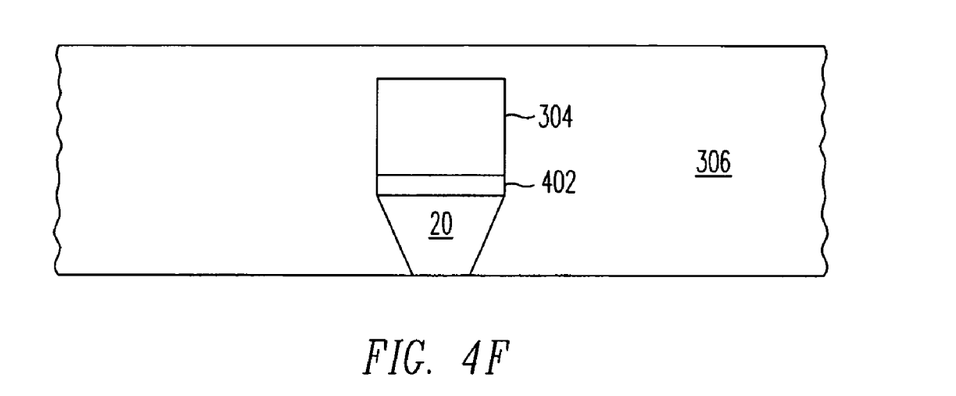
Figure 4G:
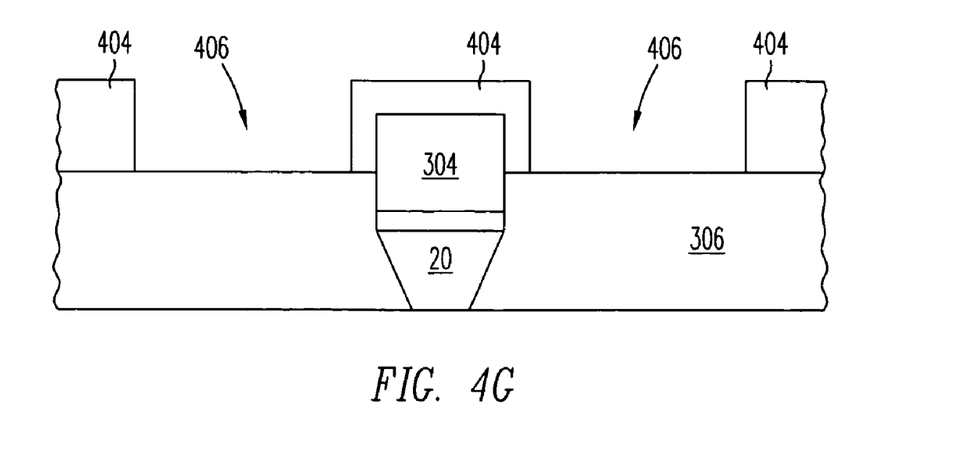

After main pole 20 has been formed, alumina layer 306 is deposited and planarized, as shown in FIGS. 4E and 4F, and then subjected to a reactive ion milling process to lower the surface of alumina layer 306 so that it intersects an edge of photoresist layer 304, as shown in FIG. 4G. A second photoresist layer 404 is deposited and patterned with an opening 406 that encloses photoresist layer 304.

Figure 4H:
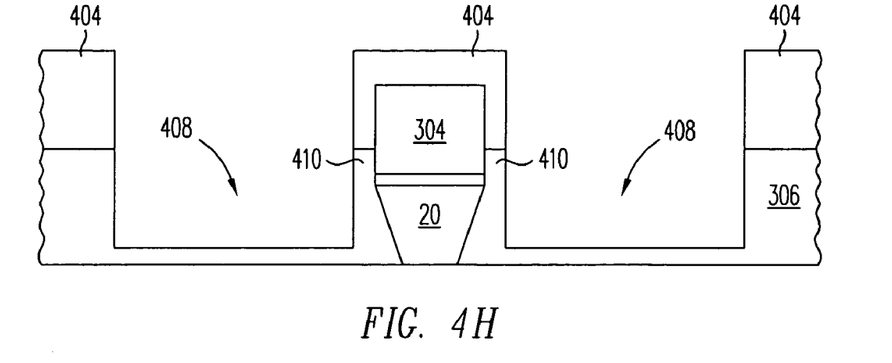

Another photoresist mask layer 404 is deposited and patterned as shown in FIG. 4G, with openings 406 on each side of photoresist layer 304. Using layer 406 as a mask, another ion milling process is performed, side openings 406 creating cavities 408 on each side of main pole 20. The resulting structure is shown in FIG. 4H. Because the portion of photoresist layer 310 between the openings 406 is wider than main pole 20, the ion milling process produces upward projecting ridges 410 on each side of main pole 20. The vertical dimension of ridges 410 could be 50 nm.

Figure 4I:
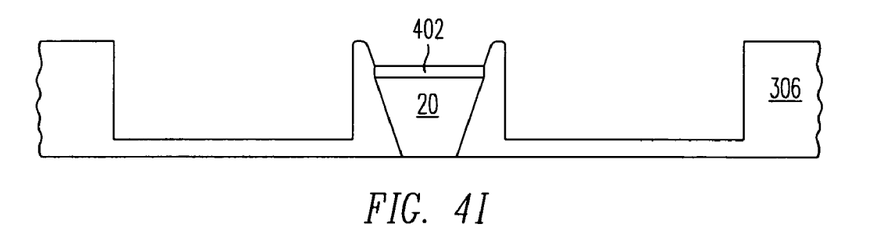
Figure 4J:
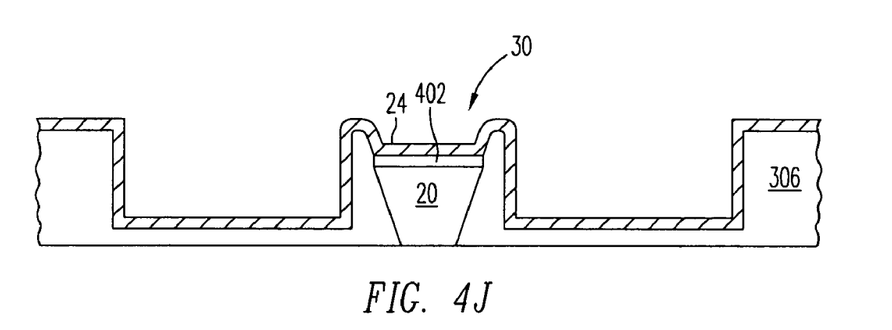
Figure 4K:
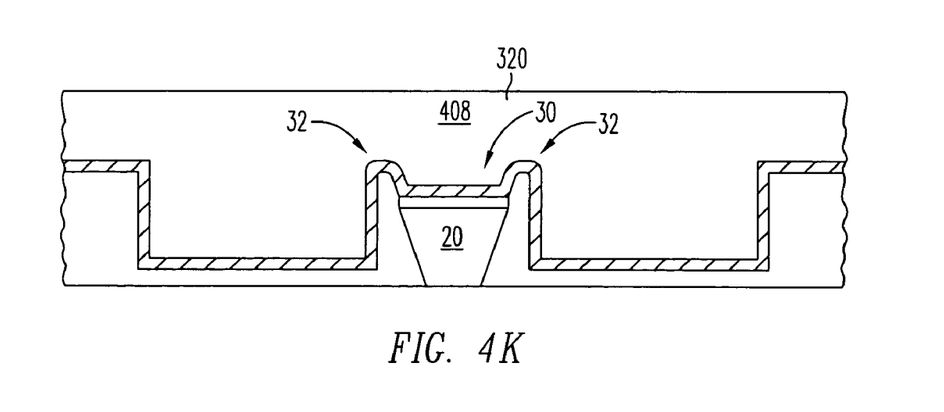

After cavities 408 have been formed, photoresist layers 304 and 404 are stripped, resulting in the structure shown in FIG. 4I. An RIE process is performed on the exposed surfaces of alumina layers 306 and 402. Top write gap 24 (Rh or Ru) is deposited on the exposed surfaces of alumina layers 306 and 402, as shown in FIG. 4J. Assuming that the thickness of hard mask layer 402 is 20 nm and the thickness of top write gap 24 is 10 nm, the total gap thickness is 30 nm. The presence of ridges 410 and the overlying top write gap 24 create notch 30 in top write gap 24 at a location on top of write pole 20. NiFe layer 320 is deposited by plating and planarized as described above, resulting in wrap around shield 408, shown in FIG. 4K. Recesses 32 are formed in wrap around shield 408 on either side of notch 30.

While specific embodiments of this invention have been described, it should by understood that these embodiments or illustrative only, and not limiting. Many different and alternative embodiments in accordance with this invention will be apparent to persons of skill in the art.

We claim:

1. A method of fabricating a perpendicular recording head comprising:

forming a main pole layer;

depositing a first mask layer on the main pole layer;

etching the main pole layer to form a main pole;

depositing an alumina layer over the first mask layer and the main pole;

removing a portion of the alumina layer such that a surface of the alumina layer intersects an edge of the first mask layer;

depositing a second mask layer having a pair of openings on opposite sides of the first mask layer;

etching the alumina layer through the pair of openings in the second mask layer so as to form a cavity on each side of the main pole and an upward extending ridge of the alumina layer on each side of the first mask layer;

removing the first and second mask layers;

depositing a write gap layer on the main pole; and depositing a magnetic layer, the magnetic layer filling the cavities and covering the write gap layer.

2. The method of claim 1 wherein said depositing the first mask layer comprises depositing a photoresist layer.

3. The method of claim 1 wherein said forming the main pole layer comprises forming a layer comprising CoFe.

4. The method of claim 1 wherein said depositing the write gap layer comprises sputtering a layer comprising Rh.

5. The method of claim 1 wherein after said removing of said portion of the alumina layer, the surface of the alumina layer is above a top surface of the main pole.

6. A method of fabricating a perpendicular recording head comprising:

forming a main pole layer;

depositing a hard mask layer on the main pole layer;

depositing a first photoresist mask layer on the hard mask layer;

etching the hard mask layer through openings in the first photoresist mask layer;

etching the main pole layer to form a main pole;

depositing an alumina layer over the hard mask layer, the first photoresist mask layer and the main pole;

removing a portion of the alumina layer such that a surface of the alumina layer intersects an edge of the first photoresist mask layer;

depositing a second photoresist mask layer having a pair of openings on opposite sides of the first photoresist mask layer;

etching the alumina layer through the pair of openings in the second mask layer so as to form a cavity on each side of the main pole and an upward extending ridge of the alumina layer on each side of the first photoresist mask layer;

removing the first and second photoresist mask layers;

depositing a write gap layer on the hard mask layer; and depositing a magnetic layer, the magnetic layer filling the cavities and covering the write gap layer.

7. The method of claim 6 wherein forming the main pole layer comprises forming a layer comprising CoFe.

8. The method of claim 6 wherein said depositing the write gap layer comprises sputtering a layer comprising Rh.

9. The method of claim 6 wherein after said removing of said portion of the alumina layer, the surface of the alumina layer is above a top surface of the main pole.

10. The method of claim 1 wherein:

said depositing the first mask layer comprises depositing a photoresist layer;

said forming the main pole layer comprises forming a layer comprising CoFe; and said depositing the write gap layer comprises sputtering a layer containing comprising Rh.

11. The method of claim 6 wherein:

said forming said main pole layer comprises forming a layer comprising CoFe;

said depositing said write gap layer comprises sputtering a layer comprising Rh; and after said removing of said portion of the alumina layer, the surface of the alumina layer is above a top surface of the main pole.

12. A method of fabricating a perpendicular recording head comprising:

forming a main pole;

depositing a first mask layer;

depositing an alumina layer over the first mask layer and the main pole;

removing a portion of the alumina layer such that a surface of the alumina layer intersects an edge of the first mask layer;

depositing a second mask layer having a pair of openings on opposite sides of the first mask layer;

etching the alumina layer through the pair of openings in the second mask layer so as to form at least a cavity on each side of the main pole;

removing the first and second mask layers;

depositing a write gap layer on the main pole; and depositing a magnetic layer, the magnetic layer filling the cavities and covering the write gap layer.

13. The method of claim 12 wherein:

said depositing the first mask layer comprises depositing a photoresist layer;

said forming the main pole comprises forming a layer comprising CoFe; and said depositing the write gap layer comprises sputtering a layer comprising Rh.

14. The method of claim 12 wherein:

said depositing the first mask layer comprises depositing a photoresist layer.

15. The method of claim 12 wherein:

said forming the main pole comprises forming a layer comprising CoFe.

16. The method of claim 12 wherein:

said depositing the write gap layer comprises sputtering a layer comprising Rh.

17. The method of claim 12 wherein:

after said removing of said portion of the alumina layer, the surface of the alumina layer is at a greater distance from a bottom surface of the main pole than the top surface of the main pole.

* * * * *

UNITED STATES PATENT AND TRADEMARK OFFICE
CERTIFICATE OF CORRECTION

| | | |
|---|---|---|
| PATENT NO. | : 7,804,662 B2 | Page 1 of 1 |
| APPLICATION NO. | : 11/645390 | |
| DATED | : September 28, 2010 | |
| INVENTOR(S) | : Tsung Yuan Chen et al. | |

It is certified that error appears in the above-identified patent and that said Letters Patent is hereby corrected as shown below:

IN THE CLAIMS:
In column 5, line 24, in Claim 10, delete "containing".

Signed and Sealed this
Eighth Day of February, 2011

David J. Kappos
*Director of the United States Patent and Trademark Office*